(12) United States Patent
Mukherji

(10) Patent No.: US 11,271,888 B1
(45) Date of Patent: Mar. 8, 2022

(54) SELECTING INFORMATION ABOUT ENTITIES FOR DISPLAY TO DRIVE INTERACTIONS ON ONLINE SYSTEMS

(71) Applicant: Meta Platforms, Inc., Menlo Park, CA (US)

(72) Inventor: Rishav Mukherji, San Francisco, CA (US)

(73) Assignee: Mela Platforms, Inc., Menlo Park, CA (US)

( * ) Notice: Subject to any disclaimer, the term of this patent is extended or adjusted under 35 U.S.C. 154(b) by 0 days.

(21) Appl. No.: 16/741,344

(22) Filed: Jan. 13, 2020

(51) Int. Cl.
*H04L 12/58* (2006.01)
*H04L 51/52* (2022.01)
*H04L 67/30* (2022.01)

(52) U.S. Cl.
CPC .............. *H04L 51/32* (2013.01); *H04L 67/30* (2013.01)

(58) Field of Classification Search
CPC ................................. H04L 51/32; H04L 67/30
USPC .......................................................... 709/206
See application file for complete search history.

(56) References Cited

U.S. PATENT DOCUMENTS

| | | | |
|---|---|---|---|
| 2016/0350672 A1* | 12/2016 | Snyder | G06N 20/00 |
| 2017/0097982 A1* | 4/2017 | Zhang | H04L 67/20 |
| 2019/0171338 A1* | 6/2019 | Voss | H04L 51/10 |
| 2020/0145504 A1* | 5/2020 | Price | G06N 20/00 |
| 2020/0184011 A1* | 6/2020 | Bastide | G06F 40/289 |
| 2021/0021559 A1* | 1/2021 | Morrison | H04L 51/32 |

\* cited by examiner

*Primary Examiner* — Frantz B Jean
(74) *Attorney, Agent, or Firm* — Fenwick & West LLP (57) ABSTRACT

An online system selects information about entities for display to viewing users based on the relevance of the information to the viewing users. The online system maintains information describing one or more third parties. The online system receives a request from a client device to provide a content item of a third party for display to a viewing user. Responsive to the request, the online system accesses information describing the third party and selects a subset of information based on a likelihood that the viewing user will interact with the content item based on the subset of information. The online system generates a content item including the selected subset of information and an element selectable to initiate an interaction with the third party and provides the generated content item to the client device for display to the viewing user.

20 Claims, 4 Drawing Sheets

SELECTING INFORMATION ABOUT ENTITIES FOR DISPLAY TO DRIVE INTERACTIONS ON ONLINE SYSTEMS

BACKGROUND

This disclosure relates generally to content selection for online systems, and more particularly to content selection describing entities to drive interactions on online systems.

Users and other entities, such as third parties or enterprises, may share, access, and interact with content on online systems. It is valuable for an online system to promote interaction between users, entities, and content items by selecting content items for users that a viewing user is likely to interact with through actions such as liking, sharing, commenting, or performing another type of user engagement. This likelihood to interact is determined according to multiple factors. For example, the online system may account for factors such as the connection between a viewing user and a posting user, the interests of the viewing user, the timestamp of the post, and others.

When entities such as third parties or enterprises submit content for presentation to users of the online system, the relevance, quality, and other attributes of the post may influence the viewing user's experience of the post and the likelihood that the viewing user will interact with the post. While some attributes of the post may be universally desirable, such as having high quality image or video content items, attributes such as the relevance of the post may vary based on the viewing user. Irrelevant content may negatively impact the performance of the post and result in missed interactions with viewing users. Relevant content may positively impact the performance of the post and drive interactions between viewing users and the post. Accordingly, there is a need for an online system that promotes relevant content in posts to viewing users, thus driving interactions with the posts.

SUMMARY

These and other issues are addressed by an online system that selects information about entities for display to viewing users based on relevance of the information to the viewing users. The online system maintains information describing entities of the online system. For example, the information includes a location of the entity, a website link or URL, a phone number, ratings, reviews, profiles or pages on the online system, business hours, an average response time, recent activity, or the like. Responsive to a request from a client device to provide a content item for an entity to a viewing user of the client device, the online system accesses a set of information describing the third party and selects a subset of the information for display to the viewing user. The selection is based at least in part on a likelihood that the viewing user will interact with the content item based on the subset of information. For example, a viewing user near a location of the third party is more likely to interact with the third party responsive to being presented with the location information than a viewing user far from the location. In another example, a viewing user may be more likely to interact with a third party if the third party has high reviews or ratings from users connected to the viewing user.

The online system generates a content item including the selected subset of information and one or more elements that are selectable to initiate an interaction with the third party. The online system then provides the generated content item to the client device for display to the viewing user.

By selecting information about third parties based on a likelihood that a viewing user will interact with a content item including the information, the online system provides information to viewing users based on multiple factors impacting the relevance of the information to the viewing user. For example, the location of a viewing user relative to the third party, the time of the request for the content item, connections of a viewing user with other users of the online system, previous interactions by the viewing user with content items, and other factors may impact the selection of information by the online system. As such, content items including selected information presented to users of the online system is more likely to drive interactions by the users with the post and associated third parties.

The figures depict various embodiments for purposes of illustration only. One skilled in the art will readily recognize from the following discussion that alternative embodiments of the structures and methods illustrated herein may be employed without departing from the principles described herein.

DETAILED DESCRIPTION

System Architecture

Figure 1:
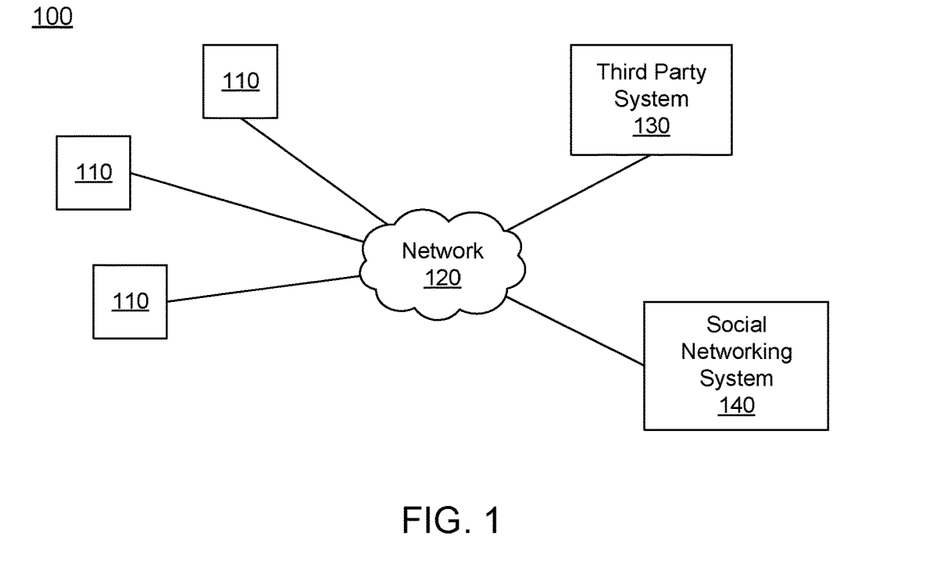
FIG. 1 is a block diagram of a system environment in which an online system operates, in accordance with an embodiment.

FIG. 1 is a block diagram of a system environment 100 for an online system 140. The system environment 100 shown by FIG. 1 comprises one or more client devices 110, a network 120, one or more third-party systems 130, and the online system 140. In alternative configurations, different and/or additional components may be included in the system environment 100. For example, the online system 140 is a social networking system, a content sharing network, or another system providing content to users.

The client devices 110 are one or more computing devices capable of receiving user input as well as transmitting and/or receiving data via the network 120. In one embodiment, a client device 110 is a conventional computer system, such as a desktop or a laptop computer. Alternatively, a client device 110 may be a device having computer functionality, such as a personal digital assistant (PDA), a mobile telephone, a smartphone, or another suitable device. A client device 110 is configured to communicate via the network 120. In one embodiment, a client device 110 executes an application allowing a user of the client device 110 to interact with the online system 140. For example, a client device 110 executes a browser application to enable interaction between the client device 110 and the online system 140 via the network 120. In another embodiment, a client device 110 interacts with the online system 140 through an application programming interface (API) running on a native operating system of the client device 110, such as IOS® or ANDROID™.

The client devices 110 are configured to communicate via the network 120, which may comprise any combination of local area and/or wide area networks, using both wired and/or wireless communication systems. In one embodiment, the network 120 uses standard communications technologies and/or protocols. For example, the network 120 includes communication links using technologies such as Ethernet, 802.11, worldwide interoperability for microwave access (WiMAX), 3G, 4G, code division multiple access (CDMA), digital subscriber line (DSL), etc. Examples of networking protocols used for communicating via the network 120 include multiprotocol label switching (MPLS), transmission control protocol/Internet protocol (TCP/IP), hypertext transport protocol (HTTP), simple mail transfer protocol (SMTP), and file transfer protocol (FTP). Data exchanged over the network 120 may be represented using any suitable format, such as hypertext markup language (HTML) or extensible markup language (XML). In some embodiments, all or some of the communication links of the network 120 may be encrypted using any suitable technique or techniques.

One or more third party systems 130 may be coupled to the network 120 for communicating with the online system 140, which is further described below in conjunction with FIG. 2. In one embodiment, a third party system 130 is an application provider communicating information describing applications for execution by a client device 110 or communicating data to client devices 110 for use by an application executing on the client device. In other embodiments, a third party system 130 provides content or other information for presentation via a client device 110. A third party system 130 may also communicate information to the online system 140, such as advertisements, content, or information about an application provided by the third party system 130.

Figure 2:
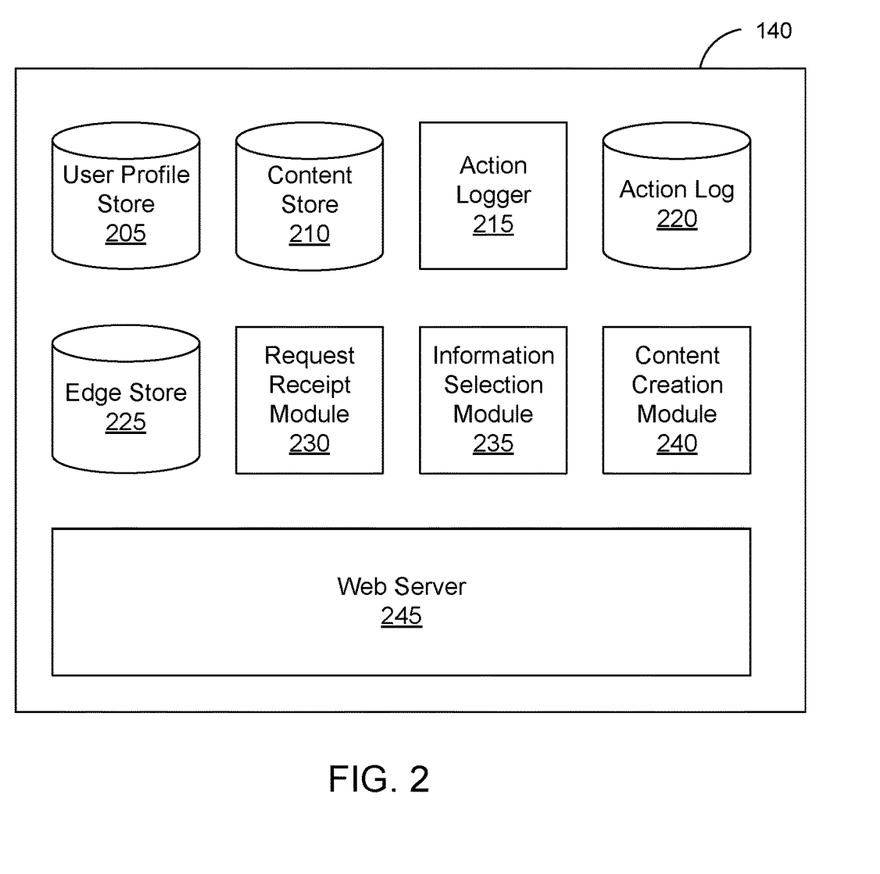
FIG. 2 is a block diagram of an online system, in accordance with an embodiment.

FIG. 2 is a block diagram of an architecture of the online system 140. The online system 140 shown in FIG. 2 includes a user profile store 205, a content store 210, an action logger 215, an action log 220, an edge store 225, a request receipt module 230, an information selection module 235, a content creation module 240, and a web server 245. In other embodiments, the online system 140 may include additional, fewer, or different components for various applications. Conventional components such as network interfaces, security functions, load balancers, failover servers, management and network operations consoles, and the like are not shown so as to not obscure the details of the system architecture.

Each user of the online system 140 is associated with a user profile, which is stored in the user profile store 205. A user profile includes declarative information about the user that was explicitly shared by the user and may also include profile information inferred by the online system 140. In one embodiment, a user profile includes multiple data fields, each describing one or more attributes of the corresponding online system user. Examples of information stored in a user profile include biographic, demographic, and other types of descriptive information, such as work experience, educational history, gender, hobbies or preferences, location and the like. A user profile may also store other information provided by the user, for example, images or videos. In certain embodiments, images of users may be tagged with information identifying the online system users displayed in an image, with information identifying the images in which a user is tagged stored in the user profile of the user. A user profile in the user profile store 205 may also maintain references to actions by the corresponding user performed on content items in the content store 210 and stored in the action log 220.

While user profiles in the user profile store 205 are frequently associated with individuals, allowing individuals to interact with each other via the online system 140, user profiles may also be stored for entities such as businesses or organizations. This allows an entity to establish a presence on the online system 140 for connecting and exchanging content with other online system users. The entity may post information about itself, about its products or provide other information to users of the online system 140 using a brand page associated with the entity's user profile. Other users of the online system 140 may connect to the brand page to receive information posted to the brand page or to receive information from the brand page. A user profile associated with the brand page may include information about the entity itself, providing users with background or informational data about the entity.

The content store 210 stores objects that each represent various types of content. Examples of content represented by an object include a page post, a status update, a photograph, a video, a link, a shared content item, a gaming application achievement, a check-in event at a local business, a brand page, or any other type of content. Online system users may create objects stored by the content store 210, such as status updates, photos tagged by users to be associated with other objects in the online system 140, events, groups or applications. In some embodiments, objects are received from third-party applications or third-party applications separate from the online system 140. In one embodiment, objects in the content store 210 represent single pieces of content, or content "items." Hence, online system users are encouraged to communicate with each other by posting text and content items of various types of media to the online system 140 through various communication channels. This increases the amount of interaction of users with each other and increases the frequency with which users interact within the online system 140.

In some embodiments, objects received from third parties 130 may include sets of information describing the third party. The set of information describing the third party 130 may include one or more of: a location of the third party (e.g., office, headquarters, storefront, etc.); a website link or URL; a phone number; one or more ratings; one or more reviews; a profile or page on the online system 140; business hours; an average response time of the third party; recent activity by the third party; a price range associated with products of the third party; and the like. In other embodiments, sets of information describing third parties 130 are stored in the user profile store 205 or in another content store. The third party 130 may also specify one or more desired interactions for objects.

The action logger 215 receives communications about user actions internal to and/or external to the online system 140, populating the action log 220 with information about user actions. Examples of actions include adding a connection to another user, sending a message to another user, uploading an image, reading a message from another user, viewing content associated with another user, and attending an event posted by another user. In addition, a number of actions may involve an object and one or more particular users, so these actions are associated with the particular users as well and stored in the action log 220.

The action log 220 may be used by the online system 140 to track user actions on the online system 140, as well as actions on third party systems 130 that communicate information to the online system 140. Users may interact with various objects on the online system 140, and information describing these interactions is stored in the action log 220. Examples of interactions with objects include: messaging a third party 130 associated with the object; calling a third party associated with the object; liking the object; sharing the object; commenting on the object or on a third party associated with the object; checking-in to physical locations via a client device 110; accessing content items, and any other suitable interactions. Additional examples of interactions with objects on the online system 140 that are included in the action log 220 include: commenting on a photo album, communicating with a user, establishing a connection with an object, joining an event, joining a group, creating an event, authorizing an application, using an application, expressing a preference for an object ("liking" the object), and engaging in a transaction. Additionally, the action log 220 may record a user's interactions with advertisements on the online system 140 as well as with other applications operating on the online system 140. In some embodiments, data from the action log 220 is used to infer interests or preferences of a user, augmenting the interests included in the user's user profile and allowing a more complete understanding of user preferences.

The action log 220 may also store user actions taken on a third party system 130, such as an external website, and communicated to the online system 140. For example, an e-commerce website may recognize a user of an online system 140 through a social plug-in enabling the e-commerce website to identify the user of the online system 140. Because users of the online system 140 are uniquely identifiable, e-commerce websites, such as in the preceding example, may communicate information about a user's actions outside of the online system 140 to the online system 140 for association with the user. Hence, the action log 220 may record information about actions users perform on a third party system 130, including webpage viewing histories, advertisements that were engaged, purchases made, and other patterns from shopping and buying. Additionally, actions a user performs via an application associated with a third party system 130 and executing on a client device 110 may be communicated to the action logger 215 by the application for recordation and association with the user in the action log 220.

In one embodiment, the edge store 225 stores information describing connections between users and other objects on the online system 140 as edges. Some edges may be defined by users, allowing users to specify their relationships with other users. For example, users may generate edges with other users that parallel the users' real-life relationships, such as friends, co-workers, partners, and so forth. Other edges are generated when users interact with objects in the online system 140, such as expressing interest in a page on the online system 140, sharing a link with other users of the online system 140, and commenting on posts made by other users of the online system 140. Edges may connect two users who are connections in a social network, or may connect a user with an object in the system. In one embodiment, the nodes and edges form a complex social network of connections indicating how users are related or connected to each other (e.g., one user accepted a friend request from another user to become connections in the social network) and how a user is connected to an object due to the user interacting with the object in some manner (e.g., "liking" a page object, joining an event object or a group object, etc.). Objects can also be connected to each other based on the objects being related or having some interaction between them.

An edge may include various features each representing characteristics of interactions between users, interactions between users and objects, or interactions between objects. For example, features included in an edge describe a rate of interaction between two users, how recently two users have interacted with each other, a rate or an amount of information retrieved by one user about an object, or numbers and types of comments posted by a user about an object. The features may also represent information describing a particular object or user. For example, a feature may represent the level of interest that a user has in a particular topic, the rate at which the user logs into the online system 140, or information describing demographic information about the user. Each feature may be associated with a source object or user, a target object or user, and a feature value. A feature may be specified as an expression based on values describing the source object or user, the target object or user, or interactions between the source object or user and target object or user; hence, an edge may be represented as one or more feature expressions.

The edge store 225 also stores information about edges, such as affinity scores for objects, interests, and other users. Affinity scores, or "affinities," may be computed by the online system 140 over time to approximate a user's interest in an object or in another user in the online system 140 based on the actions performed by the user. A user's affinity may be computed by the online system 140 over time to approximate the user's interest in an object, in a topic, or in another user in the online system 140 based on actions performed by the user. Computation of affinity is further described in U.S. patent application Ser. No. 12/978,265, filed on Dec. 23, 2010, U.S. patent application Ser. No. 13/690,254, filed on Nov. 30, 2012, U.S. patent application Ser. No. 13/689,969, filed on Nov. 30, 2012, and U.S. patent application Ser. No. 13/690,088, filed on Nov. 30, 2012, each of which is hereby incorporated by reference in its entirety. Multiple interactions between a user and a specific object may be stored as a single edge in the edge store 225, in one embodiment. Alternatively, each interaction between a user and a specific object is stored as a separate edge. In some embodiments, connections between users may be stored in the user profile store 205, or the user profile store 205 may access the edge store 225 to determine connections between users.

The request receipt module 230 receives a request by a client device 110 of a user for one or more content items to present to the viewing user (e.g., within a content feed or another content interface) and identifies information associated with the request for use in generating the one or more content items. In an embodiment, the request receipt module 230 receives a request by a client device 110 of a user for a content item of a third party 130. The third party 130 may be a business with one or more active ad campaigns on the online system 140, an entity with a page on the online system, or another entity of the online system. The request identifies the third party 130, the user of the client device 110, and metadata associated with the request. For example, the request includes a date and timestamp identifying a current time and location data identifying a current location of the client device 110.

The information selection module 235 selects information about third parties 130 to be included in generated content items for requesting users of client devices 110. Responsive to the request receipt module 230 receiving a request for a content item, the information selection module 235 accesses a set of information describing the third party 130 in the content store 210 and information stored about the requesting user in the user profile store 205. The information selection module 235 additionally accesses the metadata associated with the request. Based on the information about the request, the third party 130, and the requesting user, the information selection module 235 selects a subset of the information about the third party for inclusion in a content item for display to the requesting user.

In some embodiments, the information selection module 235 accesses one or more rules for selecting the subset of information about the third party. The online system 140 or the third party 130 establish rules specifying conditions for selecting items of information for inclusion in the content item. For example, a rule specifies that a location of the third party is selected if a location of the client device 110 is within a threshold distance (e.g., 1 mile, 5 miles, 50 miles) from the location of the third party. In another example, a rule specifies that business hours of the third party are selected if a current time of the request is within the business hours of the third party. In another example, a rule specifies that an average response time of the third party is selected if the average response time of the third party is within a threshold amount of time (e.g., 1 day, 1 hour, 5 minutes). In another example, a rule specifies that one or more ratings or reviews are selected if users connected to the viewing user have provided the one or more ratings or reviews. In other examples, other rules may be specified for selection of items of information by the information selection module 235.

In some embodiments, the information selection module 235 selects information about the third party for inclusion in a content item for display based on a likelihood that the user will interact with the content item responsive to viewing the information. In one embodiment, the likelihood that the user will interact with the content item responsive to viewing the information is determined based on historical interactions of other users with variations of the content item. For example, the online system executes AB testing or other methods of determining and storing interactions by other users with the content item.

In another embodiment, the likelihood that the user will interact with the content item responsive to viewing the information is further determined based on previous interactions by the user of the client device 110 with one or more other content items or with one or more other third parties 130. For example, the online system accesses information about previous interactions, including sets of information describing the third parties 130, frequency of interactions by the user, types of interactions by the user, and the like. Based on the information about the previous interactions, the information selection module 235 determines whether a particular type or types of information about the third parties 130 increases the likelihood of the user interacting with the content item. For example, if a user frequently initiates a messaging thread from content items including information about a third party's average response time and recent activity, the information selection module 235 is more likely to select average response time and recent activity information for inclusion in a content item. In another example, if a user frequently shares content items including information about a third party's location, the information selection module 235 is more likely to select location information for inclusion in a content item.

In another embodiment, the likelihood that the user will interact with the content item responsive to viewing the information is determined by a machine learning model. In one example, the machine learning model is configured to receive a set of user attributes describing a user and a subset of information describing the third party 130 and to output a likelihood that the user will interact with a content item having the subset of information describing the third party. The machine learning model is trained using information describing historical interactions of users of the online system with content items. For example, the information includes user attributes, subsets of information and information types included in content items, binary indicators of whether an interaction occurred, and types of interaction. Based on the generated likelihood, the information selection module 235 selects a subset of information for inclusion in the content item.

The content creation module 240 generates a content item and transmits the content item to a client device 110 for display to a viewing user. The content creation module 240 receives from the information selection module 235 a selected subset of information describing the third party 130. The content creation module 240 additionally receives from the request receipt module 230 information identifying a requesting user. The content creation module 240 generates a content item including the selected subset of information and an element selectable to initiate an interaction with the content item or with the third party 130. The generated content item is transmitted to the client device 110 for display in a content feed or other content interface.

The web server 245 links the online system 140 via the network 120 to the one or more client devices 110, as well as to the one or more third party systems 130. The web server 245 serves web pages, as well as other content, such as JAVA®, FLASH®, XML and so forth. The web server 245 may receive and route messages between the online system 140 and the client device 110, for example, instant messages, queued messages (e.g., email), text messages, short message service (SMS) messages, or messages sent using any other suitable messaging technique. A user may send a request to the web server 245 to upload information (e.g., images or videos) that are stored in the content store 210. Additionally, the web server 245 may provide application programming interface (API) functionality to send data directly to native client device operating systems, such as IOS®, ANDROID™, or BlackberryOS.

Selecting Information about Entities for Display

Figure 3:
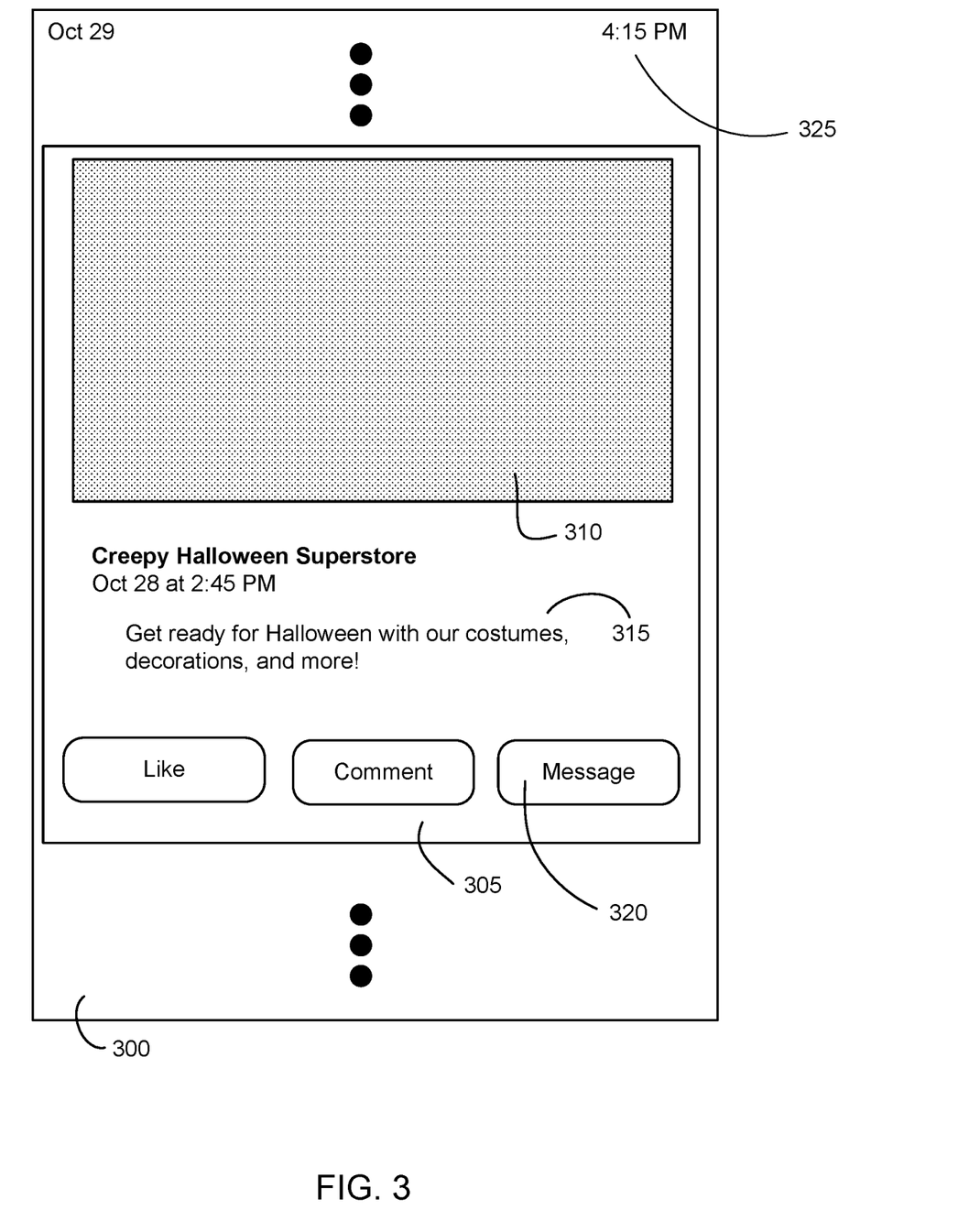
FIG. 3 is an example interface for displaying information describing an entity and initiating an interaction with the third party, in accordance with an embodiment.

FIG. 3 is an example interface for displaying information describing an entity and initiating an interaction with the third party. A user of a client device 110 accesses an online system 140. The client device 110 is associated with information describing a current state 325 of the client device. For example, as shown in FIG. 3, the information describing a current state 325 of the client device 110 include date and time information. In other examples, the information describing a current state 325 of the client device 110 includes location data of the client device. The user requests one or more content items from the online system 140 for display on the client device. For example, the user accesses a content feed 300 or another interface providing content items to a viewing user.

The content feed 300 or other interface includes a content item 305. As shown in the example of FIG. 3, the content item 305 includes a creative 310, a section of text 315 identifying a third party 130 associated with the content item ("Creepy Halloween Superstore"), identifying a date and time of posting ("October 28 at 2:45 PM"), and providing additional information about the creative ("Get ready for Halloween . . . "), and one or more selectable elements 320 for interacting with the content item or the third party. In other examples, the content item 305 may include additional creatives, different formatting of the elements, additional or less text, and additional or fewer elements for interacting with the content item or third party 130. The creative 310 may be an image or set of images, a video or set of videos, or an excerpt to a webpage. The one or more selectable elements 320 may enable the user to like, share, comment on, save, or link the content item 305 or to message the third party 130.

While the content item 305 provides information such as the third party 130, a creative 310, and interactions that may be performed with the content item or the third party, the content item of FIG. 3 does not provide additional or personalized information that may drive the viewing user to interact with the content item or the third party.

Figure 4A:
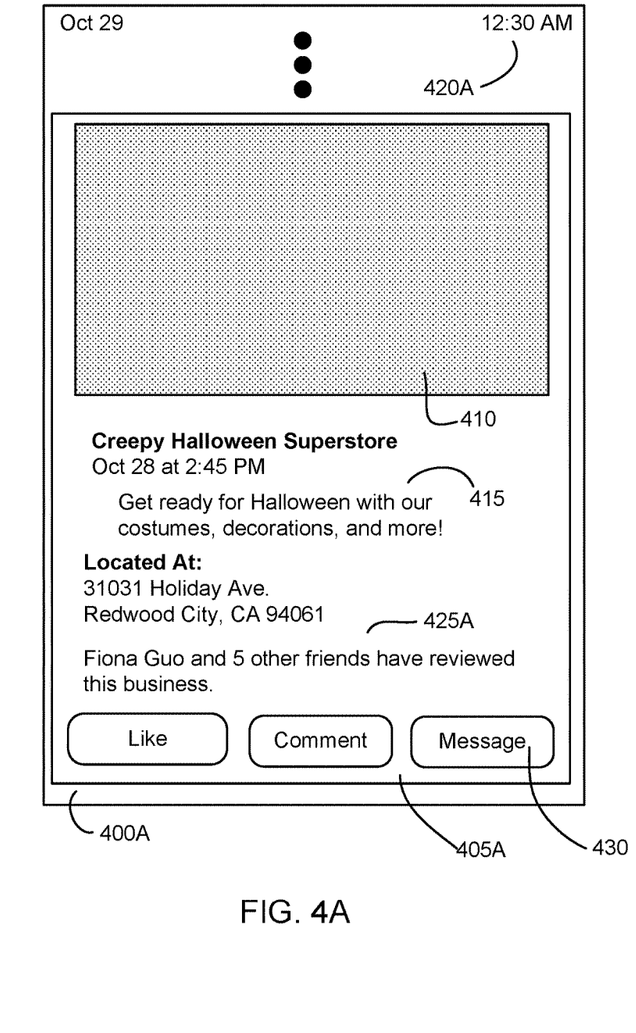
FIGS. 4A-4B are example messaging interfaces for displaying supplemental information describing a third party based on a viewing user, in accordance with an embodiment.
Figure 4B:
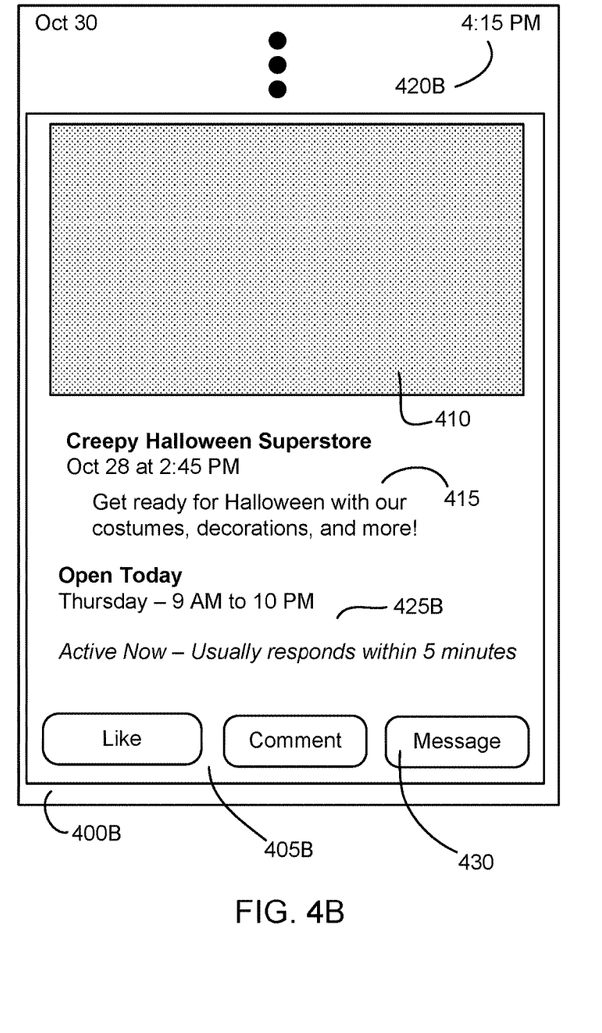

FIGS. 4A and 4B are example messaging interfaces for displaying supplemental information describing a third party based on a viewing user. FIG. 4A illustrates a first content item 405A displayed to a first viewing user of a client device 110. The viewing user accesses a content feed 400A or another content interface via a client device 110. The client device 110 is associated with information 420A identifying a time and date of access (October 29, 12:30 AM) and location data identifying a current location of the client device. The online system 140 additionally accesses stored information describing the user of the client device 110, the third party 130, and one or more connections between the user of the client device and the third party. Based on the accessed information and the client device information, the online system 140 generates the content item 405A for display within the content feed 400A including additional information about the third party 130.

In the example of FIG. 4A, the online system 140 identifies a location of the client device 110 within a threshold distance to a location associated with the third party 130. For example, the location of the client device 110 is within 10 miles of the location of the third party 130. The online system 140 further identifies that one or more friends of the user have reviewed the third party 130. Because the distance between the location of the client device 110 and the location of the third party 130 and the one or more friends of the user having reviewed the third party increases the relevance of the content item to the viewing user, the online system 140 selects the information for inclusion in the content item. The online system 140 generates the content item 405A including a creative 410, text 415 identifying the third party 130, selectable elements 430 to interact with the content item or the third party, and text 425A identifying the location of the third party ("Located at: 31031 Holiday Ave . . . ") and the one or more friends having reviewed the third party ("Fiona Guo and 5 other friends have reviewed this business"). The generated content item 405A is presented within the content feed 400A to the user of the client device 110.

FIG. 4B illustrates a second content item 405B displayed to a second viewing user of a client device 110. The viewing user accesses a content feed 400B or another content interface via the client device 110. The client device 110 is associated with information 420B identifying a time and date of access (October 30, 4:15 PM) and location data identifying a current location of the client device. As described in conjunction with FIG. 4A, the online system 140 additionally accesses stored information describing the user of the client device 110, the third party 130, and one or more connections between the user of the client device and the third party. Based on the accessed information and the client device information, the online system 140 generates the content item 405B for display within the content feed 400B including additional information about the third party 130.

In the example of FIG. 4B, the online system 140 identifies that a viewing user is accessing the content feed 400B at a time within opening hours associated with the third party 130 for the current date. The online system 140 further identifies based on activity by the third party 130 that the third party is currently active on the online system, and based on stored information about the third party 130 that the third party has an average response time within a threshold value (e.g., 10 minutes, 5 minutes, etc.). The online system 140 determines that the opening hours and average response time are relevant information for promoting an interaction by the viewing user with the third party 130 and selects the information for inclusion in the content item. The online system 140 generates the content item 405B including a creative 410, text identifying the third party 130, selectable elements 430 to interact with the content item or the third party, and text 425B identifying opening hours of the third party ("Open Today Thursday—9 AM to 10 PM") and the average response time of the third party ("Active Now—Usually responds within 5 minutes"). The generated content item 405B is presented within the content feed 400B to the user of the client device 110.

Figure 5:
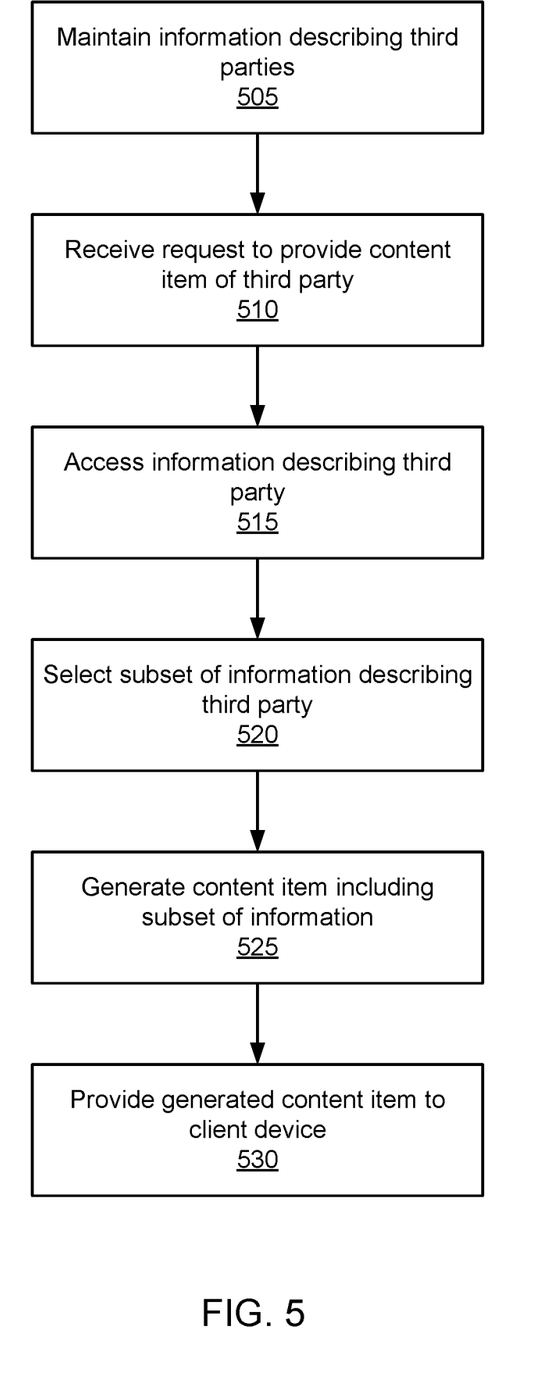
FIG. 5 is an example process for selecting information about entities for display to viewing users, in accordance with an embodiment.

FIG. 5 is an example process for selecting information about entities for display to viewing users. The steps of FIG. 5 may be performed by the online system 140, though in other embodiments, some or all of the steps may be performed by other entities or systems. In addition, other embodiments may include different, additional, or fewer steps, and the steps may be performed in different orders.

The online system 140 maintains 505 information describing one or more third parties. The information may include, for example, a location, a website link or URL, a phone number, a rating, a review, a profile or page on the online system 140, business hours, an average response time of the third party, recent activity, a price range, and the like. The online system 140 receives 510, from a client device 110, a request to provide a content item of a third party 130 for display to the user of the client device. The online system 140 accesses 515 a set of information describing the third party and selects 520 a subset of information. The selecting is performed based on a likelihood that the user of the client device will interact with the content item based on the subset of information.

The online system 140 generates 520 a content item including the selected subset of information and an element selectable to initiate an interaction with the third party 130. For example, the interaction is messaging, calling, liking, sharing, commenting, or performing another action to interact with the third party 130. The online system 140 provides 525 the content item to the client device 110 for display to the user.

CONCLUSION

The foregoing description of the embodiments has been presented for the purpose of illustration; it is not intended to be exhaustive or to limit the patent rights to the precise forms disclosed. Persons skilled in the relevant art can appreciate that many modifications and variations are possible in light of the above disclosure.

Some portions of this description describe the embodiments in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the patent rights. It is therefore intended that the scope of the patent rights be limited not by this detailed description, but rather by any claims that issue on an application based hereon. Accordingly, the disclosure of the embodiments is intended to be illustrative, but not limiting, of the scope of the patent rights, which is set forth in the following claims.

What is claimed is:

1. A method comprising:
    maintaining information describing one or more third parties;
    receiving, from a client device, a request to provide a content item of a third party for display to a user of the client device, where the content item comprises a selectable element that causes the client device to initiate a messaging thread with the third party using a messaging application on the client device;
    accessing a set of information describing the third party;
    selecting a subset of the set of information describing the third party, where the selecting is performed based on a likelihood that the user of the client device will use the selectable element to initiate a messaging thread with the third party using the messaging application on the client device if the subset of information is included in the content item;
    generating a content item, the content item including the selected subset of information and the selectable element selectable to initiate a messaging thread with the third party; and
    providing the generated content item to the client device for display.

2. The method of claim 1, wherein the set of information describing the third party includes one or more of: a location, a website link or URL, a phone number, a rating, a review, a profile or page on an online system, business hours, an average response time, recent activity, or a price range.

3. The method of claim 1, wherein the likelihood that the user of the client device will use the selectable element to initiate a messaging thread with the third party using the messaging application on the client device if the subset of information is included in the content item is determined based on historical interactions of other users with variations of the content item.

4. The method of claim 1, wherein the likelihood that the user of the client device will use the selectable element to initiate a messaging thread with the third party using the messaging application on the client device if the subset of information is included in the content item is determined by a machine learning model configured to receive the subset of information and to output a compatibility score.

5. The method of claim 1, wherein the selecting is further performed based on previous interactions by the user of the client device with one or more additional third parties.

6. The method of claim 1, wherein interaction with the third party is one or more of: messaging, calling, liking, sharing, or commenting.

7. The method of claim 1, wherein selecting a subset of information describing the third party is performed based at least in part on one or more rules specifying conditions for selecting items of information.

8. The method of claim 7, wherein the rule specifies that the selected subset of information includes a location of the third party if a location of the client device is within a threshold distance from the location of the third party.

9. The method of claim 7, wherein the rule specifies that the selected subset of information includes business hours of the third party if a current time is within the business hours of the third party.

10. The method of claim 7, wherein the rule specifies that the selected subset of information includes an average response time of the third party if the average response time of the third party is within a threshold amount of time.

11. A non-transitory computer-readable storage medium storing computer program instructions executable by a processor to perform operations comprising:
    maintaining information describing one or more third parties;
    receiving, from a client device, a request to provide a content item of a third party for display to a user of the client device, where the content item comprises a selectable element that causes the client device to initiate a messaging thread with the third party using a messaging application on the client device;
    accessing a set of information describing the third party;
    selecting a subset of the set of information describing the third party, where the selecting is performed based on a likelihood that the user of the client device will use the selectable element to initiate a messaging thread with the third party using the messaging application on the client device if the subset of information is included in the content item;
    generating a content item, the content item including the selected subset of information and the selectable element selectable to initiate a messaging thread with the third party; and providing the generated content item to the client device for display.

12. The computer-readable storage medium of claim 11, wherein the set of information describing the third party includes one or more of: a location, a website link or URL, a phone number, a rating, a review, a profile or page on an online system, business hours, an average response time, recent activity, or a price range.

13. The computer-readable storage medium of claim 11, wherein the likelihood that the user of the client device will use the selectable element to initiate a messaging thread with the third party using the messaging application on the client device if the subset of information is included in the content item is determined based on historical interactions of other users with variations of the content item.

14. The computer-readable storage medium of claim 11, wherein the likelihood that the user of the client device will use the selectable element to initiate a messaging thread with the third party using the messaging application on the client device if the subset of information is included in the content item is determined by a machine learning model configured to receive the subset of information and to output a compatibility score.

15. The computer-readable storage medium of claim 11, wherein the selecting is further performed based on previous interactions by the user of the client device with one or more additional third parties.

16. The computer-readable storage medium of claim 11, wherein interaction with the third party is one or more of: messaging, calling, liking, or commenting.

17. The computer-readable storage medium of claim 11, wherein selecting a subset of information describing the third party is performed based at least in part on one or more rules specifying conditions for selecting items of information.

18. The computer-readable storage medium of claim 17, wherein the rule specifies that the selected subset of information includes a location of the third party if a location of the client device is within a threshold distance from the location of the third party.

19. The computer-readable storage medium of claim 17, wherein the rule specifies that the selected subset of information includes business hours of the third party if a current time is within the business hours of the third party.

20. The computer-readable storage medium of claim 17, wherein the rule specifies that the selected subset of information includes an average response time of the third party if the average response time of the third party is within a threshold amount of time.

* * * * *